May 31, 1938.   P. L. BOWSER   2,119,004
LATHE CHUCK
Filed July 8, 1936   2 Sheets-Sheet 1
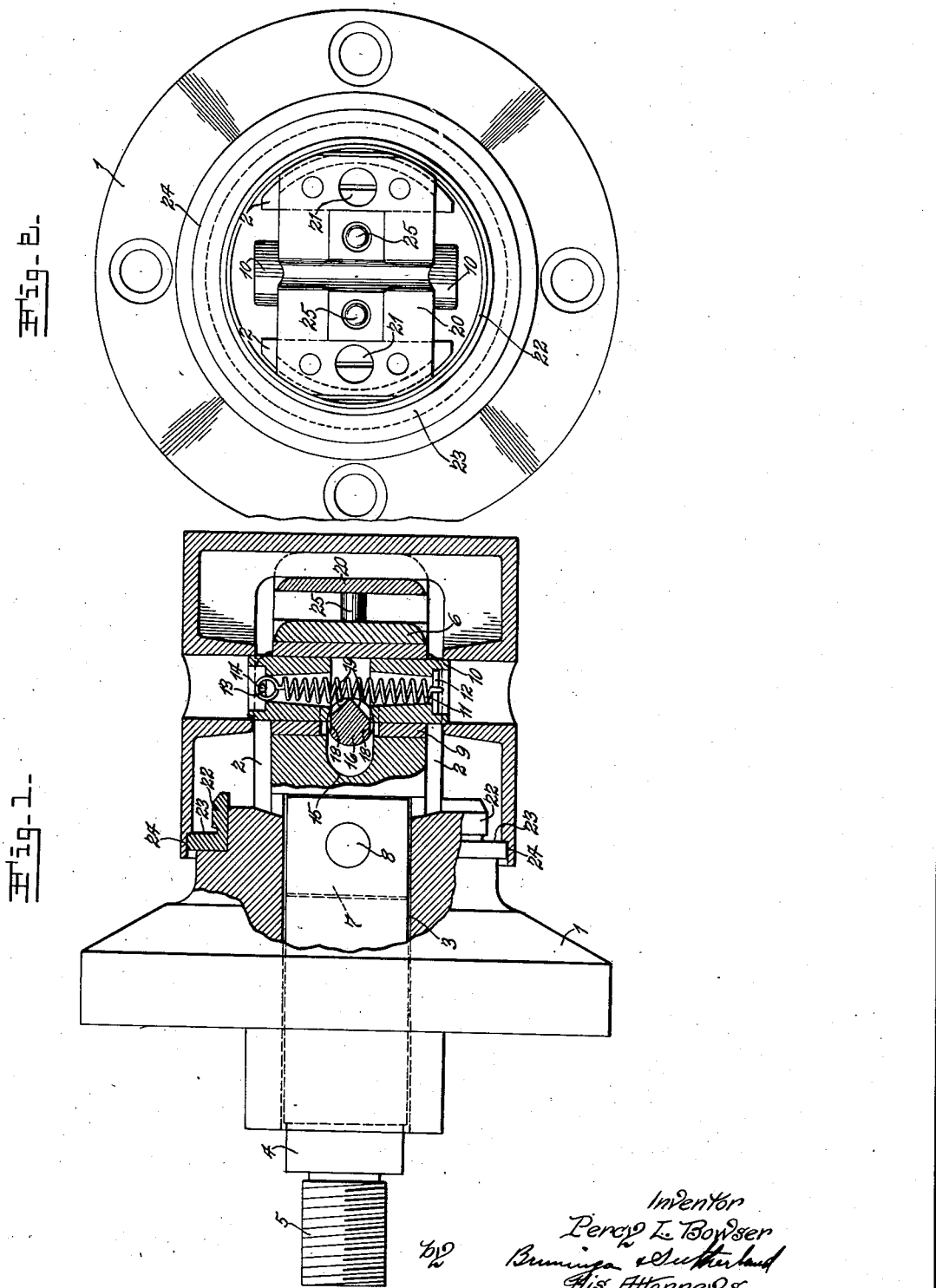

May 31, 1938.  P. L. BOWSER  2,119,004
LATHE CHUCK
Filed July 8, 1936   2 Sheets-Sheet 2

Inventor
Percy L. Bowser
His Attorneys

Patented May 31, 1938

2,119,004

UNITED STATES PATENT OFFICE 2,119,004

LATHE CHUCK

Percy L. Bowser, University City, Mo., assignor to The Sterling Corporation, St. Louis, Mo., a corporation of Delaware Application July 8, 1936, Serial No. 89,581

8 Claims. (Cl. 82—40)

This invention pertains to a chuck for supporting work in a lathe and more particularly to a chuck particularly adapted for holding piston blanks for the purpose of finishing the same in the lathe.

One of the objects of this invention is to provide a chuck adapted to hold a piston by engagement with parts entirely on the inside thereof, so as to leave all of the outside surfaces free for machining operations thereon.

Another object is to provide such a chuck which may easily be altered to adapt it to pistons of different types or designs.

Another object is to provide a chuck whereby the piston blanks may be supported rigidly and accurately centered by engagement with parts on the piston blank.

Another object is to provide a chuck of simple construction which may be cheap to manufacture and simple and rugged in operation.

Further objects will appear from the following description taken in connection with the accompanying drawings in which Figure 1 is a longitudinal sectional view of a chuck embodying this invention showing a piston blank in place thereon;

Figure 2 is an end view of the chuck shown in Figure 1.

Figure 3:
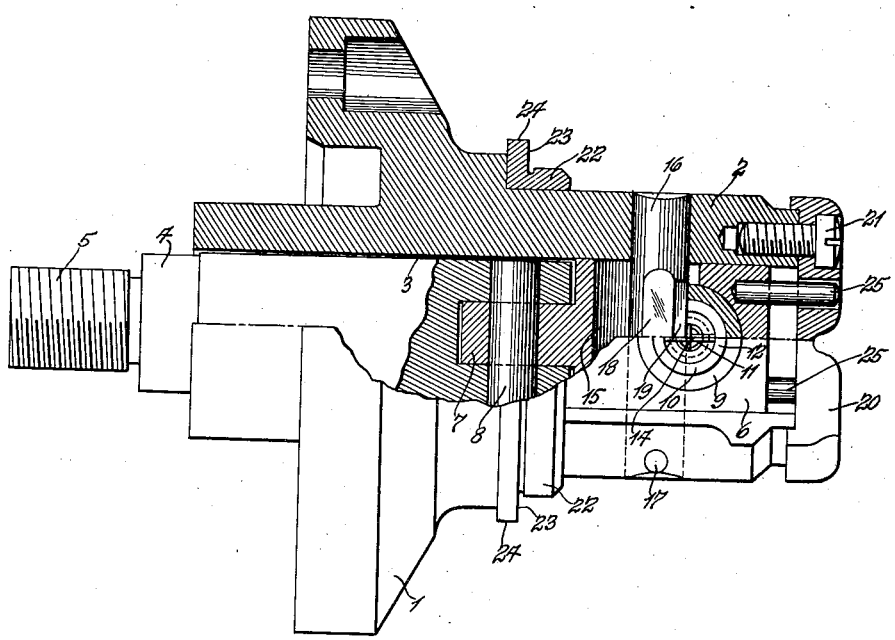
Figure 3 is a longitudinal section taken in a plane at right angles to that of Figure 1.
Figure 4:
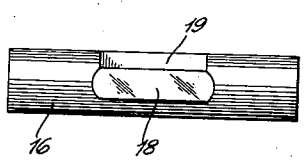
Figure 4 is a detail of the cam member.
Figure 5:
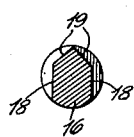
Figure 5 is a transverse central section of Figure 4.

Referring now to the drawings, 1 designates a work support adapted for mounting in any suitable manner on the spindle of an engine lathe. The support 1 is formed with a base portion providing a sort of face plate and a pair of forwardly extending arms 2 spaced apart to provide a gap therebetween. The support 1 is provided with a central bore 3 within which is mounted for movement an actuator 4. As the spindles of most engine lathes are hollow the actuator 4 is adapted to extend into the hollow spindle when the support 1 is properly mounted thereon. The rear end of the actuator 4 is provided with a screw thread 5 whereby attachment may be made to any suitable control connections for manipulating the device from the operator's station. These connections are not shown as they may be of any suitable design.

Mounted for sliding movement in the gap between the arms 2 is a carrier block 6. The carrier has a rearwardly extending tongue 7 inserted in the forked forward end of the actuator 4 and secured therein by a pivot pin 8. There is a slight clearance allowed between the adjacent parts of the actuator and the carrier so as to permit a limited pivotal movement of the carrier on the pin 8. Seated in a transverse bore in the carrier 6 is a sleeve 9 forming a guide for a pair of securing elements or locking pins 10 which are mounted for sliding movement in the sleeve 9. The pins 10 are hollow and are traversed, along their bores by a spring 11. One end of the spring 11 is provided with a head 12 seated in a countersunk recess in the end of one of the pins 10, while the other end of the spring is provided with a ring 13 secured by a pin 14 resting in a similar recess in the other pins 10. By this arrangement the spring 11 tends to draw the two pins 10 toward each other and toward the inside of the sleeve 9.

The carrier 6 is pierced by a transverse elongated slot 15 extending transversely of the sleeve 9 and partly intersecting the same. A cam bar 16 extends across the gap between the arm 2, traversing the slot 15 in the carrier. This bar is fixed at one or both ends in the arms 2 as by means of a pin 17. The middle portion of the bar 16 extends between the locking pins 10 and at this portion of the bar the sides thereof are machined flat as indicated at 18, while the forward part thereof is formed into angular cam faces 19. The relative positions of these parts are such that when the carrier 6 is in normal position the forward edge formed by the cam face 19 extends between the inner ends of the locking pins 10, so that when the carrier is retracted by the actuator 4 the pins 10 are forced to slide outwardly on the cam faces 19 and then rearwardly across the flats 18.

The forward ends of the arms 2 are bridged by a removable cap 20. This cap may be formed so as to fit the interior of the piston casting to be operated upon and may in some cases be used as an abutment against which to clamp the piston blanks. The cap may be secured in place by screws 21 or the like so as to be removable in order that different caps may be used for different pistons.

The outer surface of the arms 2 may be turned to receive an alining ring 22 having formed thereon a radially extending shoulder 23 and having an accurately sized outer rim 24. This ring is adapted to receive the open end of the piston skirt as shown in Figure 1. The ring is dimensioned so as to form a snug sliding fit in the open end of the skirt and the shoulder 23 of the ring may be used as an abutment for an interior shoulder on the piston skirt against which the piston blank may be clamped. However, in the absence of such an interior shoulder in the skirt the ring 22 may be used simply to aline the skirt while the clamping abutment is provided by the cap 20.

In the operation of this chuck the carrier 6 is moved to its forward position by manipulation of the actuator 4, the connections for such manipulations not being shown. The piston blank is then placed over the chuck with its skirt engaging the rim 24 and turned so that its wrist pin bosses stand opposite the pins 10. The actuator 4 is then drawn rearwardly or to the left, Figure 1. This draws the carrier 6 back so as to force the pins 10 against the cam surfaces 19 which operate to move the pins 10 outwardly so as to engage them in the wrist pin bosses of the piston casting. After the pins 10 have been fully extended they slide over the flat portions 18 of the cam bar while the carrier continues its rearward movement. During such movement the pins 10 acting upon the wrist pin bosses force the piston casting rearwardly until it abuts against the cap 20 or the shoulder 23 as described. The piston blank is thus firmly clamped against the abutment and is held in properly centered and alined position by the ring 22. When so held the piston has all its surfaces free for turning the outside thereof and facing both ends.

The piston is released by simply moving the actuator 4 forwardly or to the right, Figure 1. This releases the clamping pressure on the pins 10 and by moving them off of the flats 18 of the bar 16 permits them to retract to the inside of the sleeve 9 and thus disengage the wrist pin bosses of piston blank. In order to insure prompt disengagement of the piston, pins 25 may be secured in the carrier 6 to extend forwardly therefrom and through suitable perforations in the cap 20. These pins move forwardly with the carrier 6 and engage the inner surface of the piston head so as to push the piston forwardly and disengage it from the ring 22 and the cap 20.

It will be noted that this invention provides a piston chuck by means of which pistons may be very rapidly chucked for finishing in a lathe. The blank may be quickly applied to the chuck and the pin 10 engaged in the wrist pin bosses. As the piston is drawn rearwardly to be clamped against the support the carrier 6 may pivot upon the pin 8 whereby the pins 10 may adjust themselves to any uneveness in the two wrist pin bosses so as to equalize their bearing on those bosses and clamp the blank uniformly against the support. The parts are removable and interchangeable so that different types of pistons may be handled on the same chuck. To change the pistons the ring 22 may be removed and replaced by another and similarly another cap 20 may be provided for a different design of piston.

While this invention has been described as embodied in a unitary device it will be understood that individual features or sub-combinations thereof may be useful without reference to other features or to the complete combination and it is understood that the employment of such individual features or sub-combinations is contemplated by this invention and within the scope of the appended claims.

It is obvious that various changes may be made, within the scope of the appended claims, in the details of construction without departing from the spirit of this invention; it is understood, therefor, that the invention is not limited to the specific details shown and/or described.

Having described the invention what is claimed is:

1. A lathe chuck, comprising, a work support mountable on a lathe spindle, an actuator movable relatively to said support, a plurality of securing elements movable with respect to said support, and connections between said actuator and said elements operable to move the latter outwardly and toward said support in order to engage the work at a plurality of points to secure the same, said connections being flexible so as to equalize the bearing of said several elements on the work.

2. A lathe chuck for pistons, comprising, a work support mountable on a lathe spindle, an actuator movable relatively to said support, a pair of securing elements movable relatively to said support, an abutment on said support, and self adjusting connections between said actuator and said elements operable to move the latter outwardly to enter the wrist-pin bosses of the piston and toward said abutment to clamp the piston with equalized pressure thereagainst.

3. A lathe chuck for pistons, comprising, a work support mountable on a lathe spindle, an actuator movable relatively to said support, a pair of securing elements movable relatively to said support, an abutment on said support, and connections between said actuator and said elements operable to move the latter outwardly to enter the wrist-pin bosses of the piston and toward said abutment to clamp the piston thereagainst, said connections being flexible so as to equalize the bearing of said elements on the piston.

4. A lathe chuck for pistons, comprising a work support mountable on a lathe spindle, an actuator movable relatively to said support, a pair of securing elements movable relatively to said support, an abutment on said support, an alining ring removably mounted on said support adapted to center the piston skirt, and connections between said actuator and said elements operable to move the latter outwardly to enter the wrist-pin bosses of the piston and toward said abutment to clamp the piston thereagainst.

5. A machining chuck for pistons, comprising, a work support mountable on a machine spindle, an actuator movable relatively to said support, a carrier movable on said support, an abutment on said support, securing elements on said carrier, and means for operating said securing elements to engage the piston upon operation of said actuator, said carrier being self-adjustable to equalize the bearing of said securing elements on the piston.

6. A machining chuck for pistons, comprising, a work support mountable on a machine spindle, an actuator movable relatively to said support, a securing element connected for operation by said actuator outwardly and toward said support to clamp the work, and a removable alining ring providing an interchangeable alining abutment between said support and the piston.

7. A machining chuck for pistons, comprising, a work support mountable on a machine spindle, an actuator movable relatively to said support, an abutment on said support, securing elements slidable outwardly relatively to said support, means for mounting said elements for such sliding movement flexibly connected with said actuator to accommodate lateral movement of said elements in order to equalize the bearing thereof on the work, and means on said holder engaging said elements to slide the same by movement of said actuator so as to enter the bearings of the piston and after such entry to move said elements to clamp the piston against said abutment.

8. A machining chuck for pistons, comprising, a work support mountable on a machine spindle, an actuator movable relatively to said support, an abutment on said support, a carrier, securing elements slidably expandable in said carrier, means connecting said carrier to be moved by said actuator and for movement relatively thereto and to said support, and expanding means operating upon movement of said actuator to expand said elements in order to engage the bearings of the piston, whereby after such engagement said carrier is moved by said actuator to clamp the piston against said abutment while said carrier may adjust itself to equalize the bearing of said elements.

PERCY L. BOWSER.